(12) United States Patent
Nakai

(10) Patent No.: US 9,661,153 B2
(45) Date of Patent: May 23, 2017

(54) BASE STATION THAT CONFIRM THE INTENTION OF A USER TO CONTINUE A CALL

(71) Applicants: Sony Corporation, Tokyo (JP); Sony Mobile Communications, Inc., Tokyo (JP)

(72) Inventor: Takashi Nakai, Chiba (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/968,052

(22) Filed: Dec. 14, 2015

(65) Prior Publication Data

US 2016/0119485 A1 Apr. 28, 2016

Related U.S. Application Data

(63) Continuation of application No. 14/051,496, filed on Oct. 11, 2013, now Pat. No. 9,258,732, which is a
(Continued)

(30) Foreign Application Priority Data

Oct. 28, 2008 (JP) .................................. 2008-276511

(51) Int. Cl.
*H04W 72/04* (2009.01)
*H04W 4/24* (2009.01)
(Continued)

(52) U.S. Cl.
CPC ...... *H04M 15/858* (2013.01); *H04L 12/1421* (2013.01); *H04L 12/1489* (2013.01);
(Continued)

(58) Field of Classification Search
CPC .............................. H04W 4/24; H04W 72/04
(Continued)

(56) References Cited

U.S. PATENT DOCUMENTS 5,301,234 A * 4/1994 Mazziotto ........... C04B 41/5035
340/5.42
5,327,482 A * 7/1994 Yamamoto ............ H04M 1/675
379/114.14
(Continued)

FOREIGN PATENT DOCUMENTS

CN 1249879 4/2000
CN 1815965 8/2006
(Continued)

OTHER PUBLICATIONS

Office Action issued on May 7, 2013 in corresponding Japanese divisional Patent application No. 2002-265964, which was divided from Japanese patent application No. 2008-276511.
European Office Action dated Mar. 13, 2017.

*Primary Examiner* — William D Cumming
(74) *Attorney, Agent, or Firm* — Haug Partners LLP; William S. Frommer

(57) ABSTRACT

A radio communication control device accepts a call-up from a radio communication terminal and includes a unit configured to detect the degree of jamming in a cell, a unit configured to confirm the intention of a user of a terminal concerned as to whether the call-up is continued regardless of addition of an extra to the user's telephone call charge when the call-up has been made from a radio communication terminal in the cell concerned in a specific jammed state, a unit configured to block the call-up concerned in accordance with the confirmed intention of the user of the terminal concerned and a unit configured to change charge setting so as to add an extra to the user's telephone call
(Continued)

charge when the call-up has not been blocked in the specific jammed state.

7 Claims, 14 Drawing Sheets

Related U.S. Application Data continuation of application No. 12/606,233, filed on Oct. 27, 2009, now Pat. No. 8,588,722.

(51) Int. Cl.
| | |
|---|---|
| *H04M 15/00* | (2006.01) |
| *H04L 12/14* | (2006.01) |
| *H04M 15/28* | (2006.01) |
| *H04W 4/26* | (2009.01) |
| *H04W 28/02* | (2009.01) |
| *H04W 4/12* | (2009.01) |
| *H04W 28/12* | (2009.01) |

(52) U.S. Cl.
CPC .......... *H04M 15/00* (2013.01); *H04M 15/28* (2013.01); *H04M 15/58* (2013.01); *H04M 15/66* (2013.01); *H04M 15/745* (2013.01); *H04M 15/80* (2013.01); *H04M 15/805* (2013.01); *H04M 15/8022* (2013.01); *H04M 15/8027* (2013.01); *H04M 15/81* (2013.01); *H04M 15/83* (2013.01); *H04M 15/835* (2013.01); *H04M 15/8351* (2013.01); *H04M 15/85* (2013.01); *H04M 15/851* (2013.01); *H04M 15/88* (2013.01); *H04M 15/883* (2013.01); *H04W 4/12* (2013.01); *H04W 4/24* (2013.01); *H04W 4/26* (2013.01); *H04W 28/0231* (2013.01); *H04M 2215/0108* (2013.01); *H04M 2215/0112* (2013.01); *H04M 2215/0116* (2013.01); *H04M 2215/0128* (2013.01); *H04M 2215/0168* (2013.01); *H04M 2215/74* (2013.01); *H04M 2215/7421* (2013.01); *H04M 2215/7428* (2013.01); *H04M 2215/7457* (2013.01); *H04M 2215/81* (2013.01); *H04M 2215/8104* (2013.01); *H04M 2215/815* (2013.01); *H04M 2215/8108* (2013.01); *H04M 2215/8154* (2013.01); *H04M 2215/8183* (2013.01); *H04M 2215/82* (2013.01); *H04W 28/12* (2013.01)

(58) Field of Classification Search
USPC ............ 455/405, 406, 407, 410, 432.1, 433, 455/435.1, 456.1
See application file for complete search history.

(56) References Cited

U.S. PATENT DOCUMENTS

| | | | |
|---|---|---|---|
| 5,473,671 A | 12/1995 | Partridge, III | |
| 5,970,403 A | 10/1999 | Alperovich et al. | |
| 6,070,067 A * | 5/2000 | Nguyen ................ | H04M 15/28 455/405 |
| 6,088,431 A * | 7/2000 | LaDue ................. | H04M 15/854 379/114.2 |
| 6,088,584 A * | 7/2000 | Lundborg ............. | H04M 15/00 455/406 |
| 6,330,315 B1 | 12/2001 | Kapsales et al. | |
| 6,424,914 B1 | 7/2002 | Lin | |
| 6,516,194 B2 * | 2/2003 | Hanson ................ | H04M 15/00 455/407 |
| 6,704,557 B1 | 3/2004 | Krishnamurthy et al. | |
| 6,741,687 B1 * | 5/2004 | Coppage ............... | H04M 15/00 379/114.01 |
| 7,079,849 B2 * | 7/2006 | Hanson ................ | H04M 15/00 455/456.1 |
| 7,149,293 B1 * | 12/2006 | Coppage ............... | H04M 15/00 379/114.01 |
| 7,152,038 B2 | 12/2006 | Murashita et al. | |
| 7,366,135 B2 | 4/2008 | Konishi et al. | |
| 7,389,106 B2 | 6/2008 | Dawson et al. | |
| 7,426,471 B1 | 9/2008 | Briscoe et al. | |
| 7,634,446 B2 * | 12/2009 | Jones .................... | G06Q 20/10 455/406 |
| 7,729,484 B1 * | 6/2010 | Coppage ............... | H04M 15/00 379/114.01 |
| 8,200,187 B2 * | 6/2012 | Jain ...................... | H04M 15/745 455/405 |
| 8,467,766 B2 * | 6/2013 | Rackley, III ......... | G06Q 20/042 455/406 |
| 8,489,067 B2 * | 7/2013 | Rackley, III ......... | G06Q 20/102 455/406 |
| 8,588,722 B2 | 11/2013 | Nakai | |
| 8,588,735 B1 * | 11/2013 | Baker .................. | G06Q 10/103 455/406 |
| 8,712,397 B2 * | 4/2014 | Feng .................... | H04L 63/0227 455/410 |
| 8,825,002 B2 * | 9/2014 | Meyer .................. | H04W 72/04 455/405 |
| 2001/0031636 A1 * | 10/2001 | Hanson ................ | H04M 15/00 455/432.1 |
| 2002/0062236 A1 | 5/2002 | Murashita et al. | |
| 2002/0120400 A1 | 8/2002 | Lin | |
| 2003/0083067 A1 * | 5/2003 | Hanson ................ | H04M 15/00 455/433 |
| 2004/0132449 A1 * | 7/2004 | Kowarsch ............ | H04W 4/24 455/432.1 |
| 2006/0026004 A1 | 2/2006 | Van Nieuwenhuizen | |
| 2007/0072584 A1 * | 3/2007 | Jain ...................... | H04M 15/745 455/405 |
| 2008/0085697 A1 * | 4/2008 | Fukaya ................ | G06Q 20/32 455/406 |
| 2008/0102853 A1 | 5/2008 | Kagimoto et al. | |
| 2008/0126145 A1 * | 5/2008 | Rackley, III ......... | G06Q 20/102 455/406 |
| 2010/0105368 A1 | 4/2010 | Nakai | |
| 2010/0145861 A1 * | 6/2010 | Law ..................... | G06Q 20/102 705/76 |
| 2012/0077496 A1 * | 3/2012 | Mathias ................ | G06Q 30/06 455/435.1 |
| 2012/0202449 A1 * | 8/2012 | Meyer .................. | H04L 12/1403 455/405 |
| 2012/0330769 A1 * | 12/2012 | Arceo .................. | G06Q 20/4014 705/21 |
| 2014/0038551 A1 | 2/2014 | Nakai | |

FOREIGN PATENT DOCUMENTS

| | | |
|---|---|---|
| EP | 1 732 336 | 12/2006 |
| JP | 2000 174932 | 6/2000 |
| JP | 2000-350253 | 12/2000 |
| JP | 2001-75785 | 3/2001 |
| JP | 2001-78260 | 3/2001 |
| JP | 2001-313699 | 11/2001 |
| JP | 2002-111912 | 4/2002 |
| JP | 2002-190866 | 7/2002 |
| JP | 2002 217964 | 8/2002 |
| JP | 2002 262345 | 9/2002 |
| JP | 2003-61141 | 2/2003 |
| JP | 3 3899922 B2 | 3/2003 |
| JP | 2004-222058 | 8/2004 |
| JP | 2006-345406 | 12/2006 |
| JP | 2008-11178 | 1/2008 |
| WO | WO 99 65185 | 12/1999 |

\* cited by examiner

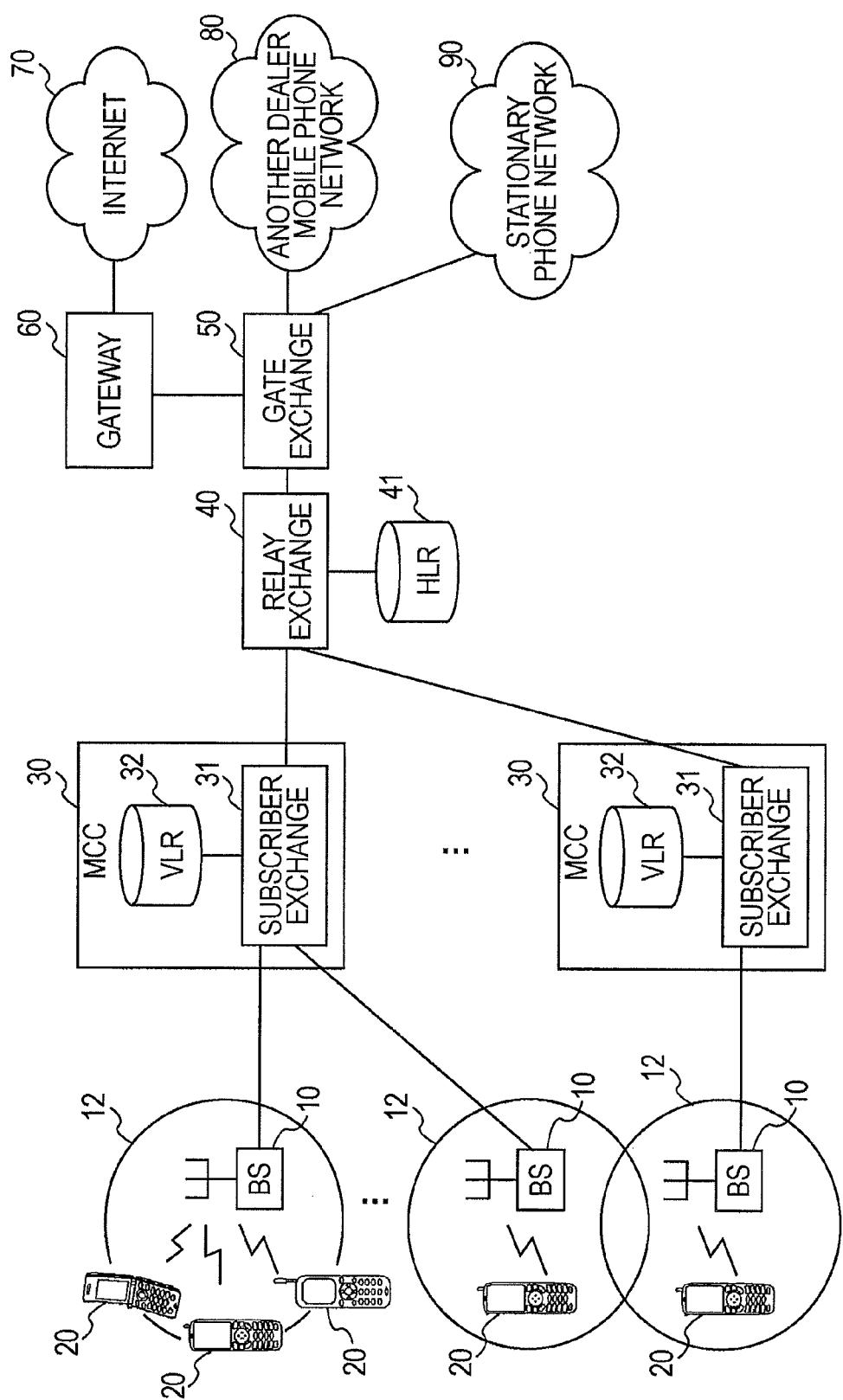

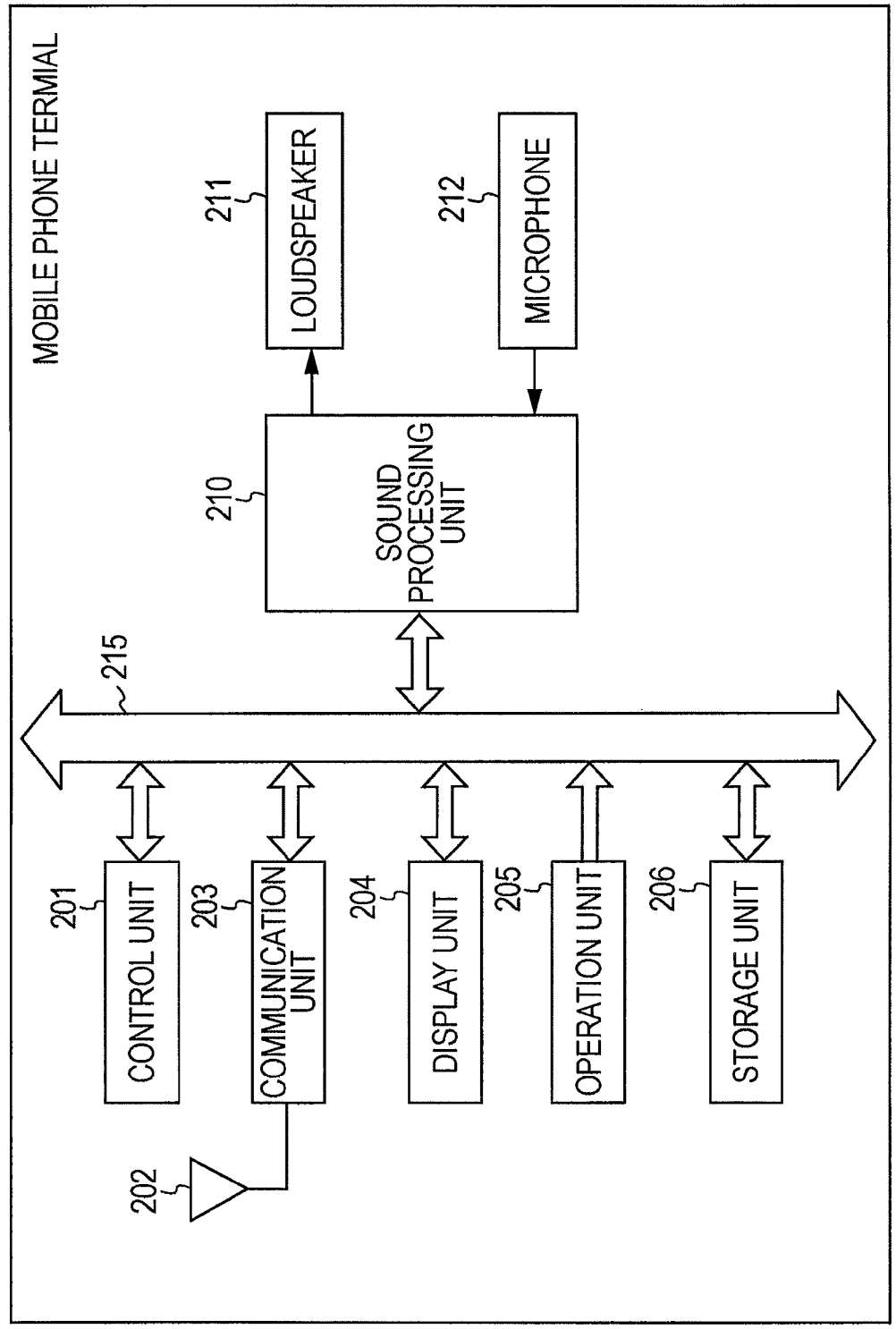

| CELL STATE | TELEPHONE CALL CHARGE (PER UNIT TIME) |
|---|---|
| I (USUAL) | F1 |
| II | F2 |
| III | F3 |

| CELL STATE | TELEPHONE CALL CHARGE (PER UNIT TIME) | ALLOWABLE CONTINUOUS CALL TIME |
|---|---|---|
| I (USUAL) | F1 | T1(∞) |
| II | F2 | T2 |
| III | F3 | T3 |

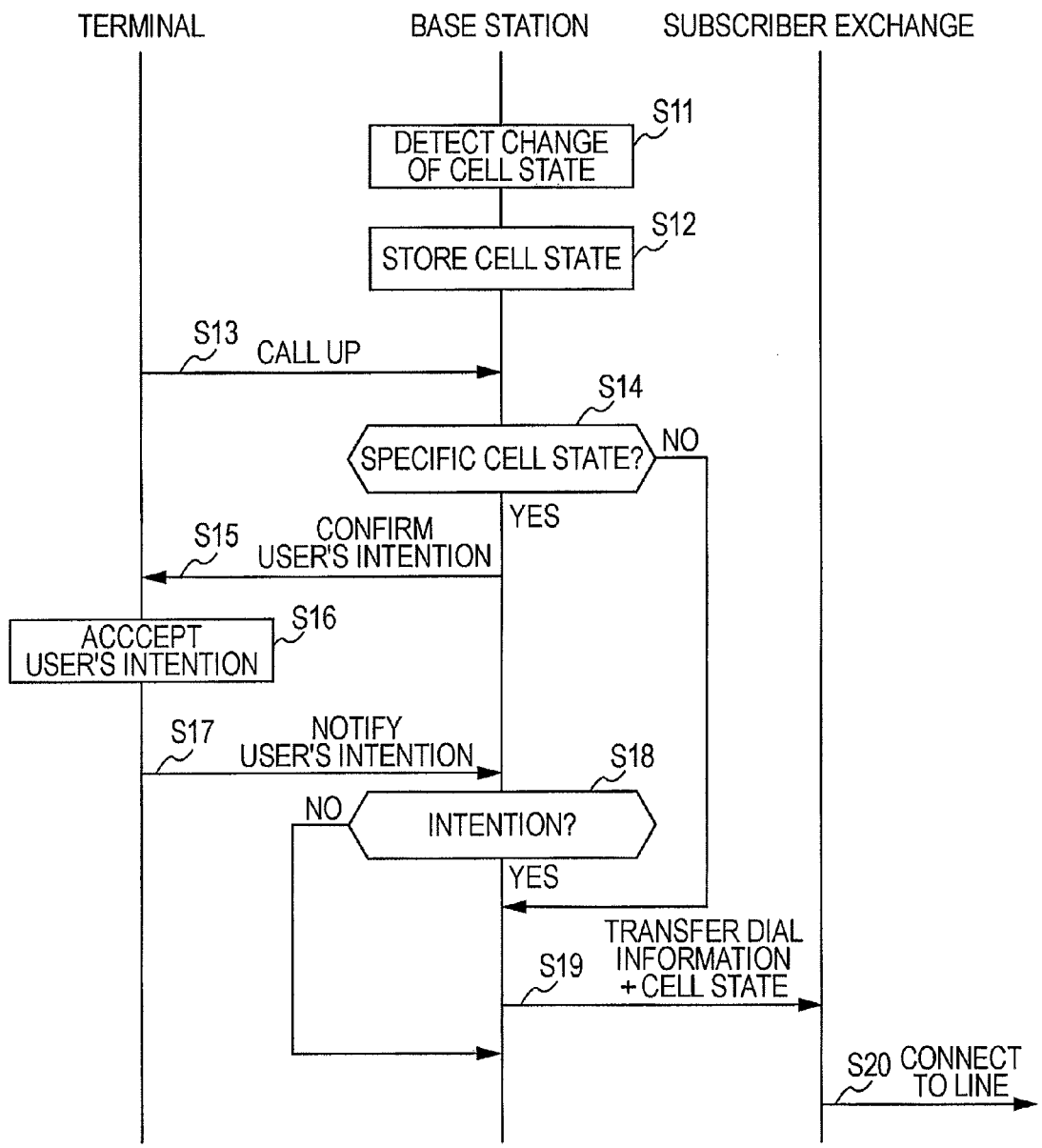

BASE STATION THAT CONFIRM THE INTENTION OF A USER TO CONTINUE A CALL

This is a continuation of application Ser. No. 14/051,496, filed Oct. 11, 2013, which is a continuation of application Ser. No. 12/606,233, filed Oct. 27, 2009, now U.S. Pat. No. 8,588,722, issued Nov. 19, 2013, with a claim under 35 USC 119 to priority Japanese Application 2008-276511, filed in Japan Oct. 28, 2008, the entirety of which is hereby incorporated by reference herein.

BACKGROUND OF THE INVENTION

1. Field of the Invention

The present invention relates to a radio communication system configured to realize talking over mobile phone terminals.

2. Description of the Related Art

In radio communication via mobile phones, although communication efficiency is increased with developing the communication technology, how a limited radio resource is efficiently utilized may still remain as a problem. As an example of an improving measure to eliminate this problem, there is proposed a system configured to buy and sell a resource in accordance with a fluctuation in traffic (see Japanese Laid-open Patent Publication No. 2002-217964).

In addition, there is also proposed a mobile communication system configured such that the telephone call charge for intra-home-zone calls is made different from that for extra-home-zone calls in a radio communication network (see Japanese Laid-open Patent Publication No. 2000-174932). In this bulletin, there is also described an effect that a home zone in which the telephone call charge of a mobile phone is made as low as that of a stationary telephone is realized, thereby reducing the load on the radio communication network.

SUMMARY OF THE INVENTION

Incidentally, it may sometimes occur that a large number of terminal users who want to make calls gather for a specific time period and at a specific location such as a station square when it rains suddenly or a shrine and surrounding area in the New Year. Under the circumstances as mentioned above, it may be expected to generate calling-up and call-receiving operations exceeding the communication capacity. In the above mentioned case, voice calling may become difficult or may end in failure.

However, it may be difficult for the system to buy and sell the resource described in Japanese Laid-open Patent Publication No. 2002-217964 to cope with the fluctuation in traffic at a specific location and for a specific time period.

The network load reducing effect brought about by the system described in Japanese Laid-open Patent Publication No. 2000-174932 may be limited. That is, the load on the network is merely reduced by the amount corresponding to the number of alternative wire networks and dynamic reduction of the load in a dealer's intended area may be difficult.

The present invention has been made in view of the circumstances as mentioned above. Therefore, it is desirable to dynamically and efficiently reduce the load on the radio communication network in accordance with a location and a time period.

According to an embodiment of the present invention, there is provided a radio communication control device that accepts a call-up from a radio communication terminal including a unit configured to detect the degree of jamming in a cell, a unit configured to confirm the intention of a user of a terminal concerned as to whether the call-up is continued regardless of addition of an extra to the user's telephone call charge when the call-up has been made from a radio communication terminal in the cell concerned in a specific jammed state, a unit configured to block the call-up concerned in accordance with the confirmed intention of the user of the terminal concerned and a unit configured to change charge setting so as to add an extra to the user's telephone call charge when the call-up has not been blocked in the specific jammed state.

The degree of jamming in the cell concerned may be determined on the basis of the number of mobile phone terminals which have been registered in a position registered area concerned. The terminal user's intention may be confirmed by inquiring of the terminal user about it in advance or confirmed in accordance with his intention that has been previously set and stored. As an alternative, the intention may be confirmed by inquiring of the terminal user about it each time.

According to an embodiment of the present invention, in the case that a call is made using a mobile phone terminal from within a jammed cell, a rule that an extra is added to the user's telephone call charge in accordance with a jammed state is first presented and then the intention of the user is confirmed so as to permit only the user whose intention has been confirmed to talk over the phone. That is, only a user who has admitted the addition of the extra to his telephone call charge is permitted to talk over the phone. As a result, it may be expected that the number of call-ups is reduced and the traffic jam is reduced.

According to an embodiment of the present invention, there is also provided a radio communication control device that calls a radio communication terminal of a call mate up including a unit configured to detect a jammed state in a cell, a unit configured to confirm, when a call-in to a terminal belonging to the cell concerned has been made in a specific jammed state, a previously declared intention of a user of a terminal concerned as to whether reception of the call-in (hereinafter, referred to as call reception) is refused and a unit configured to block connection to the terminal concerned when the confirmed intention is an intention to refuse call reception in the specific jammed state.

The intention of the user of the terminal concerned as to whether call reception is refused in the specific jammed state is stored in advance, and in the case that a telephone call has been made to a terminal in a jammed cell, connection is blocked or allowed in accordance with the stored intention. Incidentally, in the above mentioned case, as motivation to refuse the call reception, a predetermined privilege may be granted to the terminal user who has refused the call reception.

As will be described in detail later, embodiments of the present invention may be also implemented in the form of a radio communication system and a radio communication terminal.

According to an embodiment of the present invention, there is further provided a radio communication terminal that performs data communication including a unit configured to set as to whether high speed data communication is refused in a QoS guaranteed area and a unit configured to block uploading and downloading at a high data rate in the case that setting to refuse the high speed data communication is made.

According to an embodiment of the present invention, it may become possible to reduce the number of call transmitting and receiving operations, corresponding to an arbitrary time period for which a cell is jammed at an arbitrary location, for example, such as a shrine area in the New Year or a station and surrounding area in a rainy day. That is, it may become possible to effectively utilize a limited radio resource, flexibly coping with arbitrary location and time period.

BRIEF DESCRIPTION OF THE DRAWINGS

FIG. 1 is a diagram illustrating a schematic configuration of a radio communication system according to an embodiment of the present invention;

FIG. 2 is a block diagram illustrating a schematic hardware configuration of a mobile phone terminal functioning as a document preparing device according to an embodiment of the present invention;

FIG. 3A is a diagram illustrating one configurational example of a cell-state-based telephone call charge table;

FIG. 3B is a diagram illustrating another configurational example of a cell-state-based telephone call charge table;

FIG. 4 is a sequence chart illustrating an example of an operation that a call transmission side performs according to an embodiment of the present invention;

DESCRIPTION OF THE PREFERRED EMBODIMENTS

Figure 5:
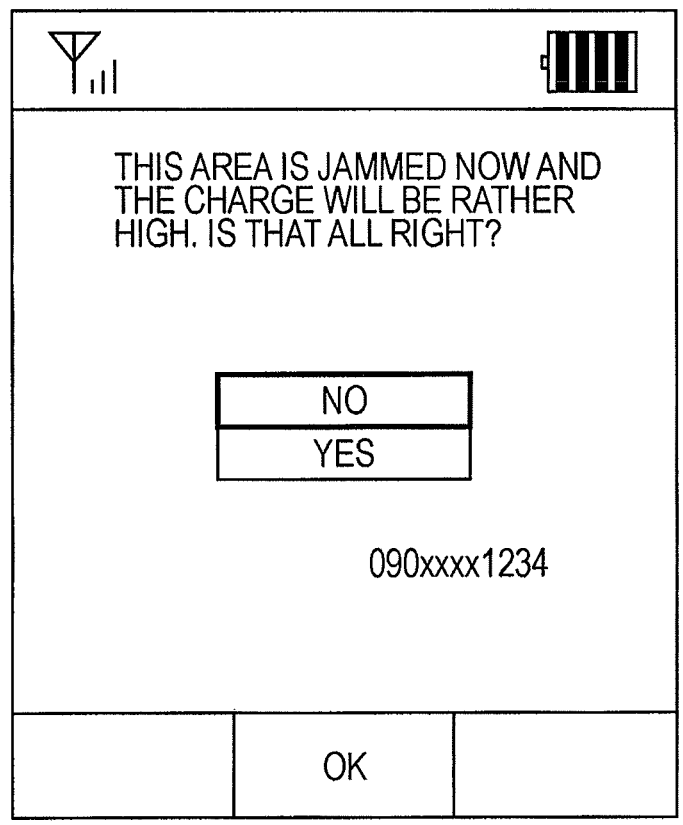
FIG. 5 is a diagram illustrating one example of a display screen on a terminal according to an embodiment of the present invention.

Next, preferred embodiments of the present invention will be described with reference to the accompanying drawings.

FIG. 1 illustrates a schematic configuration of a radio communication system according to an embodiment of the present invention. Although the entire configuration illustrated in FIG. 1 is referred to as a radio communication system in a broad sense, a single constitutional element illustrated in FIG. 1 or a combination of a plurality of constitutional elements illustrated in FIG. 1 may be referred to as a radio communication system defined in the appended patent claims. As a radio communication terminal according to an embodiment of the present invention, a mobile phone terminal having at least a talking-over-the-phone (hereinafter, referred to as talking) function will be described by way of example.

Each of a plurality of mobile phone terminals 20 performs radio communication, typically, with a neighboring base station (BS) 10. Each base station (BS) 10 constitutes a cell 12 as an area where the base station is radio-communicable with the mobile phone terminal 20. The base station 10 is connected to a subscriber exchange 31. The subscriber exchange 31 finds out a location where a call mate is present in accordance with the telephone number of the terminal of the call mate to which the user of the terminal concerned has transmitted a call and establishes a communication path for talking. The subscriber exchange 31 has a database holding therein position registered data of mobile phone terminals in its own area called a visitor location register (VLR) 32 including corresponding data of the telephone number and the terminal ID (TMSI: Temporary Mobile Subscriber Identity) of each mobile phone terminal. The subscriber exchange 31 and the VLR 32 are included in a mobile communication control station (MCC) 30. The mobile communication control station 30 also includes a radio network control device (RNC) not illustrated. A plurality of subscriber exchanges 31 are connected together via a relay exchange 40. A database called a home location register (HLR) 41 is connected to the relay exchange 40. The home location register (HLR) 41 is a database holding therein the position registered data of all the mobile phone terminals.

Typically, at which position each terminal is currently present is registered in the home location register (HLR) 41 in units of a position registered area in which the plurality of cells 12 are gathered. The position registered data in the VLR 32 corresponds to part of the position registered data in the HLR 41.

The relay exchange 40 is connected to another dealer's mobile phone network 80 and a stationary phone network 90 via a gate exchange 50. In addition, the gate exchange 50 is connected to Internet 70 via a gateway 60.

In the case that a user of a mobile phone terminal A has made a call to (called up) the telephone number of another mobile phone terminal B, the base station 10 installed near the terminal A establishes a communication path via radio waves between it and the subscriber exchange 31 concerned. Then, the subscriber exchange 31 confirms the current location of the terminal B on the basis of the telephone number of the call mate and with reference to the HLR 41. Incidentally, in the case that the terminal B belongs to the position registered area of the base station 10 which is connected to the same subscriber exchange 31, this fact is found by referring to the VLR 32 concerned. Then, the subscriber exchange 31 of the mate terminal performs general calling (paging) on all the terminals belonging to its managing position registered area via the base station to confirm whether the terminal B, that is, the mate terminal is present in its position registered area. When a response has been given from the terminal B, the exchange makes a request to the terminal B for call setting to connect it to a line (channel) to connect the terminal B to the radio network control device. As a result, talking between terminals belonging to the same mobile phone dealer may become possible. The mobile phone terminal 20 may also communicate with a mobile phone terminal belonging to the mobile phone network 80 of another dealer for talking via the relay exchange 40 and the gate exchange 50. Likewise, the mobile phone terminal 20 may communicate with a stationary telephone terminal belonging to the stationary telephone network 90 for talking via the relay exchange 40 and the gate exchange 50.

FIG. 2 is a block diagram illustrating a schematic hardware configuration of the mobile phone terminal 20.

The mobile phone terminal 20 includes a control unit 201, a communication unit 203, a display unit 204, an operation unit 205, a storage unit 206 and a sound processing unit 210 which are mutually connected via a bus 215, and a loudspeaker 211 and a microphone 212 connected to the sound processing unit 210.

The control unit 201 includes a processor such as a CPU so as to control the operations of respective units of the mobile phone terminal 20.

The communication unit 203 includes an RF section and a modulation/demodulation circuit so as to be in radio communication with the base station for talking and data communication via an antenna 202.

The display unit 204 includes a display such as an LCD so as to display information such as characters and images on a display screen.

The operation unit 205 includes various keys such as control keys and ten keys so as to accept instructions and data inputting operations performed by a user.

The storage unit 206 includes a ROM and a RAM so as to store programs and data (including telephone directory data) of OSs and various applications executed using the CPU. The ROM may include a re-writable nonvolatile memory such as a flush memory.

The sound processing unit 210 includes a sound encoder, a sound decoder, a sound DA converter and a sound AD converter so as to output sounds to the loudspeaker 211 and input sounds from the microphone 212.

Although not illustrated in the drawing, the mobile phone terminal 20 also includes functional sections installed in a typical mobile phone terminal such as a power source section, a light emitting section and a vibrator.

Figure 14:
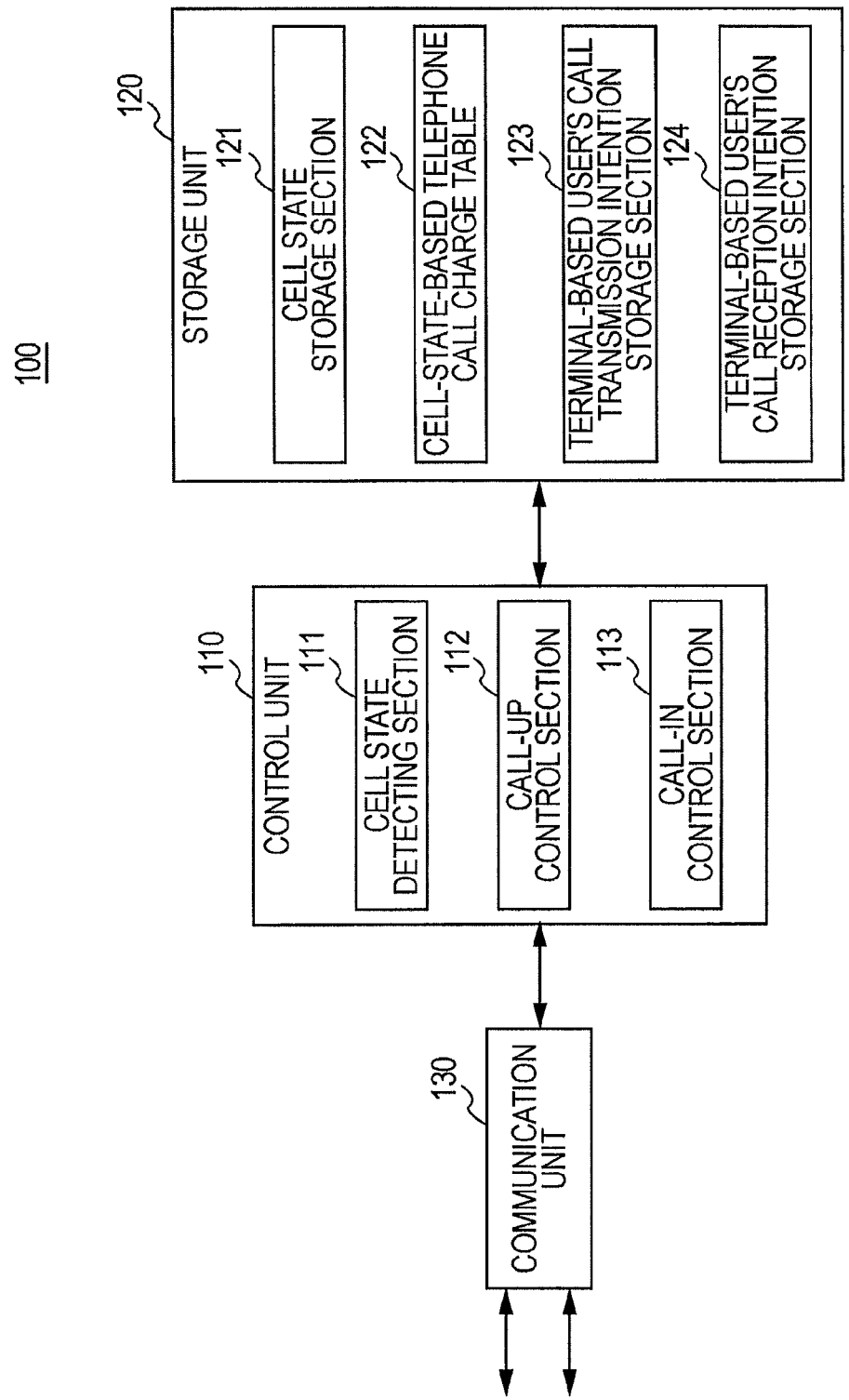
FIG. 14 is a block diagram illustrating a schematic functional configuration of a radio communication device according to an embodiment of the present invention.

FIG. 14 is a block diagram illustrating a schematic functional configuration of a radio communication control device 100 according to an embodiment of the present invention. The radio communication control device 100 is configured to manage main functions according to an embodiment of the present invention and is supposed to be installed in the base station 10 according to an embodiment of the present invention. However, the location of the radio communication control device 100 may not be limited thereto and it may be installed in the MCC 30 or may be dispersedly installed in the MCC 30 and the base station 10.

The control unit 110 has a cell state detecting section 111 configured to detect a cell state indicative of the degree of jamming (or a jammed state) of a base-station-oriented cell, a call-up control section 112 configured to accept and control a call-up from a terminal belonging to the cell concerned and a call-in control section 113 configured to control a call-in to a terminal belonging to the cell concerned. The control unit 110 performs necessary communications with external devices via the communication unit 130. The storage unit 120 is connected to the control unit 110 and has a cell state storage section 121, a cell-state-based telephone call charge table 122, a terminal-based user's call transmission intention storage section 123 and a terminal-based user's call reception intention storage section) 124.

The cell state storage section 121 is a section configured to store a detected current cell state of the cell concerned. The cell-state-based telephone call charge table 122 is a data table configured to settle the telephone call charges per cell state. The terminal-based user's call transmission intention storage section 123 is a section configured to store a user's intention which has been declared in advance as to whether a call is transmitted in a jammed state. The terminal-based user's call reception intention storage section 124 is a section configured to store a user's intention which has been declared in advance as to whether a call is received in a jammed state.

Note that, according to an embodiment of the present invention, all the functional sections illustrated in FIG. 14 may not be necessary and functions which are utilized may differ for different embodiments of the present invention which will be described later.

FIGS. 3A and 3B illustrate configurational examples of the cell-state-based telephone call charge table 122 according to embodiments of the present invention. Charge setting is changed so as to add an extra to the telephone call charge to a user of a terminal concerned on the basis of the cell-state-based telephone call charge table 122 in the case that the terminal has not blocked a call-up in a specific jammed state. The location of the telephone call charge table 122 as mentioned above may not be limited to a specific place and the table may be disposed anywhere as long as the table may be referred to as necessary.

FIG. 3A illustrates a telephone call charge table 122a indicating corresponding relation between respective cell states and telephone call charges F1, F2 and F3 corresponding to the respective cell states.

In the example illustrated in FIG. 3A, the cell state is information indicative of the degree of jamming of terminals per cell as described above and states which are set at three stages I, II and III are indicated. The state I is a first usual state, the state II is a second state which is higher than the usual state in the degree of jamming and the state III is a third state which is higher than the second state in the degree of jamming. According to an embodiment of the present invention, at which stage the cell state is to be set is judged by comparing the number of the mobile phone terminals in a cell concerned with a predetermined threshold value. Incidentally, the number of states may not be limited to three and may be two, four or more.

The telephone call charges F1, F2 and F3 may be determined on the basis of a time period (minute or second) per unit time, a rate of extra charge (% or magnification) or charge class identification information. In any case, the telephone call charge per unit time is increased in the order of the states I, II and III. That is, the higher the degree of jamming is, the higher the telephone call charge is and hence a possibility that a user refuses transmission of a call (hereinafter, referred to as call transmission) may be expected to be increased.

FIG. 3B illustrates a telephone call charge table 122b indicating corresponding relation between cell state dependent telephone call charges and allowable continuous call time periods. In this telephone call charge table, upper limit allowable continuous call time periods T1, T2 and T3 for which continuous talking is allowed in each cell state are determined in addition to the setting of the telephone call charge table illustrated in FIG. 3A. The time period T1 in the usual state has no limitation (is infinite). The allowable continuous call time periods T2 and T3 may be the same as each other or may be different from each other. In the latter case, the time periods are set to become gradually shorter, for example, in the order of the states I, II and III. The allowable continuous call time periods are set in order to prevent the radio resource from being continuously occupied by the same person for a long time when jammed.

Next, an example of an operation performed to limit talking when jammed according to an embodiment of the present invention will be described. As limitations on talking when jammed, a limitation on a transmission side (a calling side) and a limitation on a reception side (a called side) may be thought of. In an embodiment of the present invention, description will be made on the assumption that a cell defined in units of a base station does not coincide with a position registered area defined in units of a plurality of cells. In the above mentioned case, it is supposed to decide the degree of jamming of a certain cell on the basis of the number of terminals registered in the position registered area to which the cell belongs. It goes without saying that other arbitrary methods may be used to measure the degree of jamming as long as detection of the degree of jamming of terminal users in units of a cell may be possible. In addition, the cell may coincide with the position registered area.

FIG. 4 is a sequence chart illustrating an example of an operation that the call transmission side performs according to an embodiment of the present invention. The base station sequentially detects a change in state of a cell (S11). Specifically, the number of terminals registered in a position registered area to which the cell of the base station concerned belongs is confirmed with reference to the VLR 32 of the subscriber exchange 31 concerned and the confirmed number of the terminals is compared with the predetermined threshold value to decide the cell state. In the case that a change in state of the cell has been detected, the cell state which has been obtained after changed is stored (S12).

Then, in the case that a call-up has been made from a terminal in the cell, by designating the telephone number of a call mate (S13), the current cell state of the base station is confirmed (S14). In the case that the cell state is a specific cell state, that is, the unusual state II or III in the above mentioned example, a notification of addition of an extra to the telephone call charge (in case of the example illustrated in FIG. 3B, allowable continuous call time periods are also included) is sent to (the user of) the terminal from which the call-up concerned is made to confirm whether the user has an intention to continue transmitting a call (S15). It may be possible to inform a user of this notification by displaying a specific message saying that "THIS AREA IS NOW JAMMED AND TELEPHONE CALL CHARGE WILL BE RATHER HIGH. IS THAT ALL RIGHT?" on the display screen of the terminal as illustrated in FIG. 5. The terminal accepts a declaration of the user's intention to the inquiring message as mentioned above (S16). In the case that the declaration of the user's intention to continue transmitting the call has been made (Yes at S18), the dial information of the mate terminal is transferred to the subscriber exchange together with the current cell state (S19). As a result, calling-up of the mate terminal is performed and line connection is established in accordance with a response from the mate terminal (S20). In the case that talking has been performed, a charging process is performed on the user concerned on the basis of the current cell state and the call time period together with the details of a contract that the user of the terminal concerned has made. In the case that the allowable continuous call time period is settled, the connection is cut off using the base station or the subscriber exchange when the call time period has reached the settled time period.

Incidentally, in the case that the current cell state is the usual state at step S14, the process promptly proceeds to step S19. In the case that the current cell state is usual, it may be unnecessary to transfer the cell state to the subscriber exchange.

Figure 6:
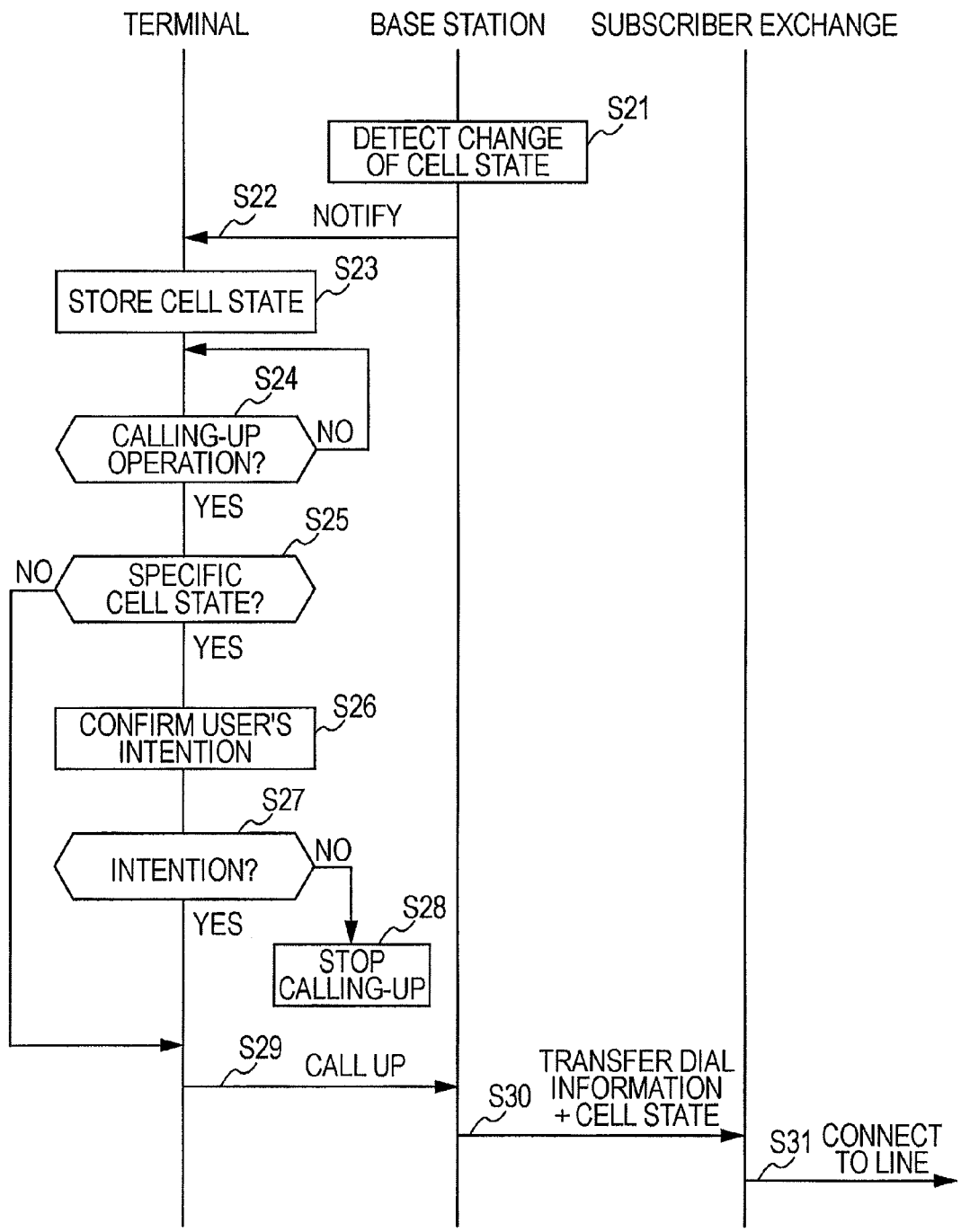
FIG. 6 is a sequence chart illustrating another example of the operation that the call transmission side performs according to an embodiment of the present invention.

FIG. 6 is a sequence chart illustrating another example of the operation that the call transmission side performs according to an embodiment of the present invention.

In the case that a change in state of the cell has been detected (S21), the base station notifies all the terminals in a cell concerned of the detected cell state (S22). The terminals that have received the notification temporarily store the cell state (S23). Then, when a calling-up operation by a user has been performed using any one of the terminals (S24), the terminal confirms the stored cell state (S25). When the cell state is a specific cell state (the states II or III) (Yes at S25), whether the user intends to transmit a call (hereinafter, referred to as the user's call transmission intention) is confirmed (S26). At this moment, the user's intention may be confirmed by displaying the message as illustrated in FIG. 5. In the case that the user's call transmission intention has been set in advance as described later with reference to FIG. 8, the details of setting are confirmed.

In the case that it has been confirmed that the user has no call transmission intention, the terminal blocks (suspends) the call-up (S28). On the other hand in the case that it has been confirmed that the user has the call transmission intention, the call-up is made to the base station (S29). The base station transfers the dial information to the subscriber exchange together with the current cell state (S30). As a result, calling-up of the mate terminal is made and line connection is established in accordance with a response from the mate terminal (S31).

As an alternative, the base station may send a notification to a terminal concerned only when a specific cell state (the state II or III) has been detected. In the above mentioned case, when the cell has been returned from the specific cell state to the usual cell state, the base station notifies the terminal concerned of this fact, or when a predetermined time period has elapsed from when the terminal concerned has stored the specific cell state, the stored cell state is automatically returned to the usual cell state.

Figure 7:
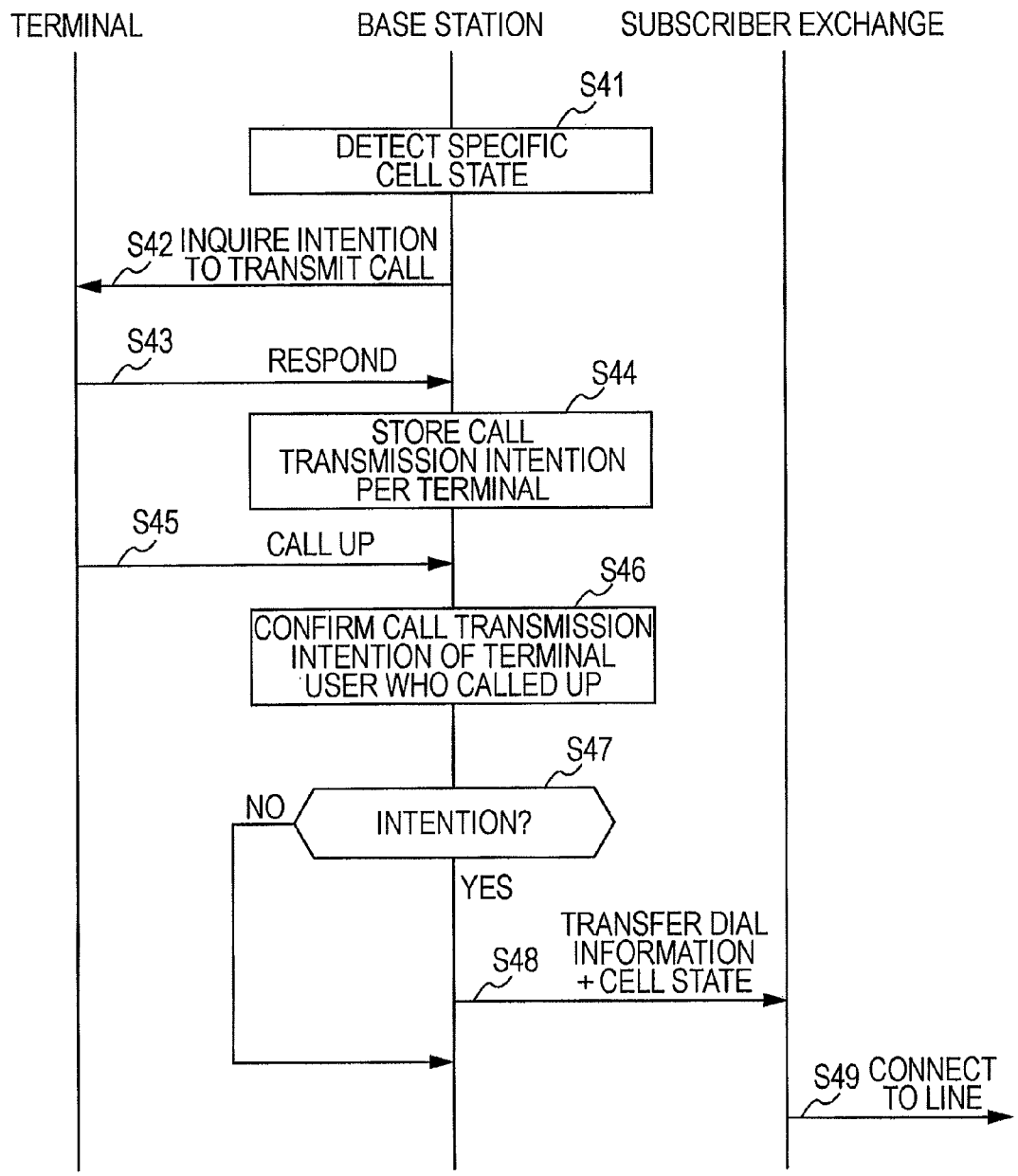
FIG. 7 is a sequence chart illustrating a further example of the operation that the call transmission side performs according to an embodiment of the present invention.

FIG. 7 is a sequence chart illustrating a further example of the operation that the transmission side performs according to an embodiment of the present invention.

Figure 8:
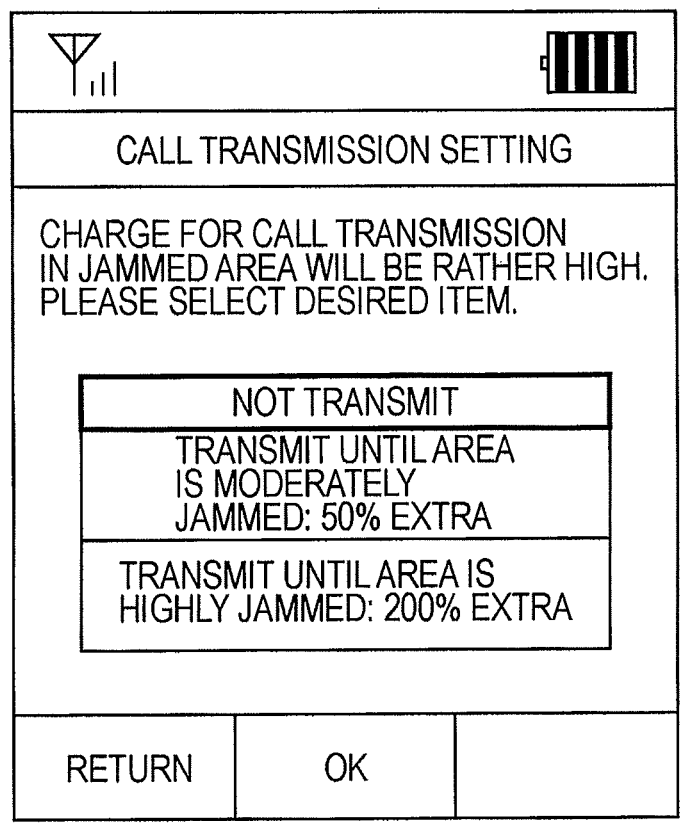
FIG. 8 is a diagram illustrating one example of a reception setting screen according to an embodiment of the present invention.

When the base station has detected the specific cell state (the state II or III in the above mentioned example) (S41), the base station inquires of all the terminals belonging to the cell concerned about call transmission intentions of their users in advance (S42). In the above mentioned case, an inquiring message as illustrated in FIG. 8 is displayed on the display screen of each terminal to present case list elements to each user. In the example illustrated in FIG. 8, three case list elements "NOT TRANSMIT", "TRANSMIT UNTIL AREA IS MODERATELY JAMMED: 50% EXTRA" and "TRANSMIT UNTIL AREA IS HIGHLY JAMMED: 200% EXTRA" are displayed. When a reply has been accepted from each user (S43), the call transmission intentions of the users concerned are stored in the terminal-based user's call transmission intention storage section 123 per terminal (S44). Then, in the case that a call-up has been made from any one of the terminals (S45), the base station confirms the call transmission intention of the user of the terminal from which the call-up has been made, from the stored details (S46). In the case that the user has declared the intention to continue transmitting the call (Yes at S47), the dial information of the mate terminal is transferred to the subscriber exchange together with the current cell state (S48). As a result, calling-up of the mate terminal is performed and line connection is established in accordance with a response from the mate terminal (S49). As an alternative, a notification that an extra is added to the telephone call charge may be sent to the user. When talking has been performed, the charging process is performed on the user concerned on the basis of the current cell state and the call time period together with the details of the contract that the user of the terminal concerned has made. In the case that the user concerned has no call transmission intention, the base station may transmit a notification that call transmission has been blocked in accordance with the declaration of the user's intention to the terminal concerned such that the user may recognize the situation.

In addition, although not illustrated in the drawing, in the case that a terminal has entered the area of the base station which is in a specific cell state from the outside, the notification (S22 in FIG. 6) and the inquiry about the call transmission intention (S42 in FIG. 7) may be made.

Next, an example of an operation that a reception side performs according to an embodiment of the present invention will be described.

Not only the case in which a call is made using a terminal in a jammed cell (a call-up) but also the case in which a call is made to a terminal in the jammed cell (a call-in) may cause an increase in traffic.

Figure 9:
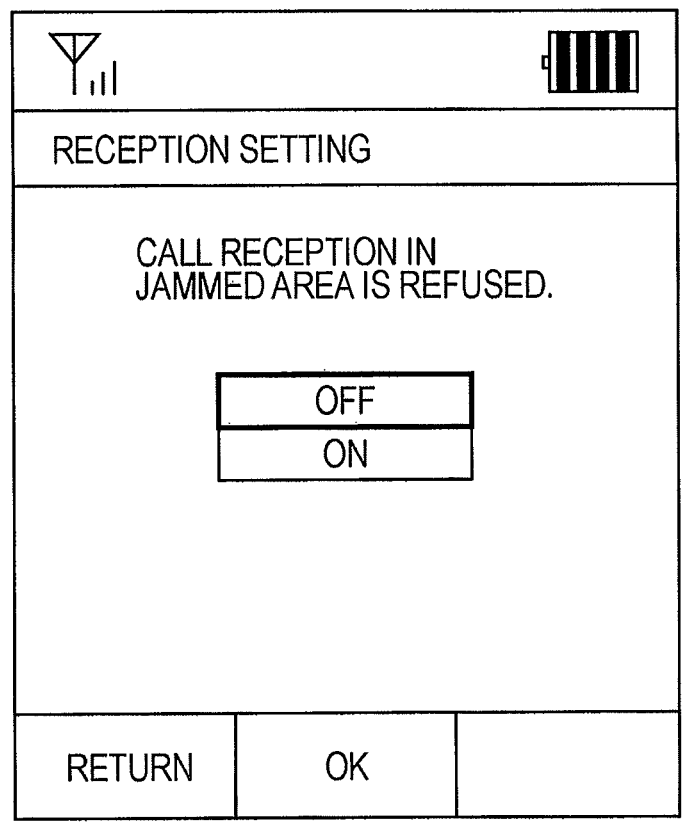
FIG. 9 is a diagram illustrating another example of the reception setting screen according to an embodiment of the present invention.

FIG. 9 illustrates a screen example of reception setting that a user performs in advance in relation to a reception side. In the example illustrated in FIG. 9, case list elements "OFF" and "ON" are displayed and presented to a user concerned together with a message saying that "CALL RECEPTION IN JAMMED AREA IS REFUSED". When the user selects "ON", reception of a call (hereinafter, referred to as call reception) in the jammed area is blocked. When "OFF" is selected, the call reception is accepted as usual. In the case that a blocking process is performed on the side of the base station, information set for each user is transmitted to the base station side to be stored in the terminal-based user's call reception intention storage section 124 per terminal.

Incidentally, in the case that although a request for call reception is actually made from another terminal, the call reception is blocked while setting to refuse the call reception is being performed, a certain privilege may be granted from the side of a communication dealer to the user who has refused the call reception. The privilege may be granted in the form of, for example, repayment of a predetermined amount of money or rate (a reduction in telephone call charge) or elongation of a free call time period. As a result, it may become possible to give an incentive to refusing the call reception to the user. The privilege may be granted every time call reception is actually refused or when setting to refuse call reception has been performed as the case may be.

Figure 10:
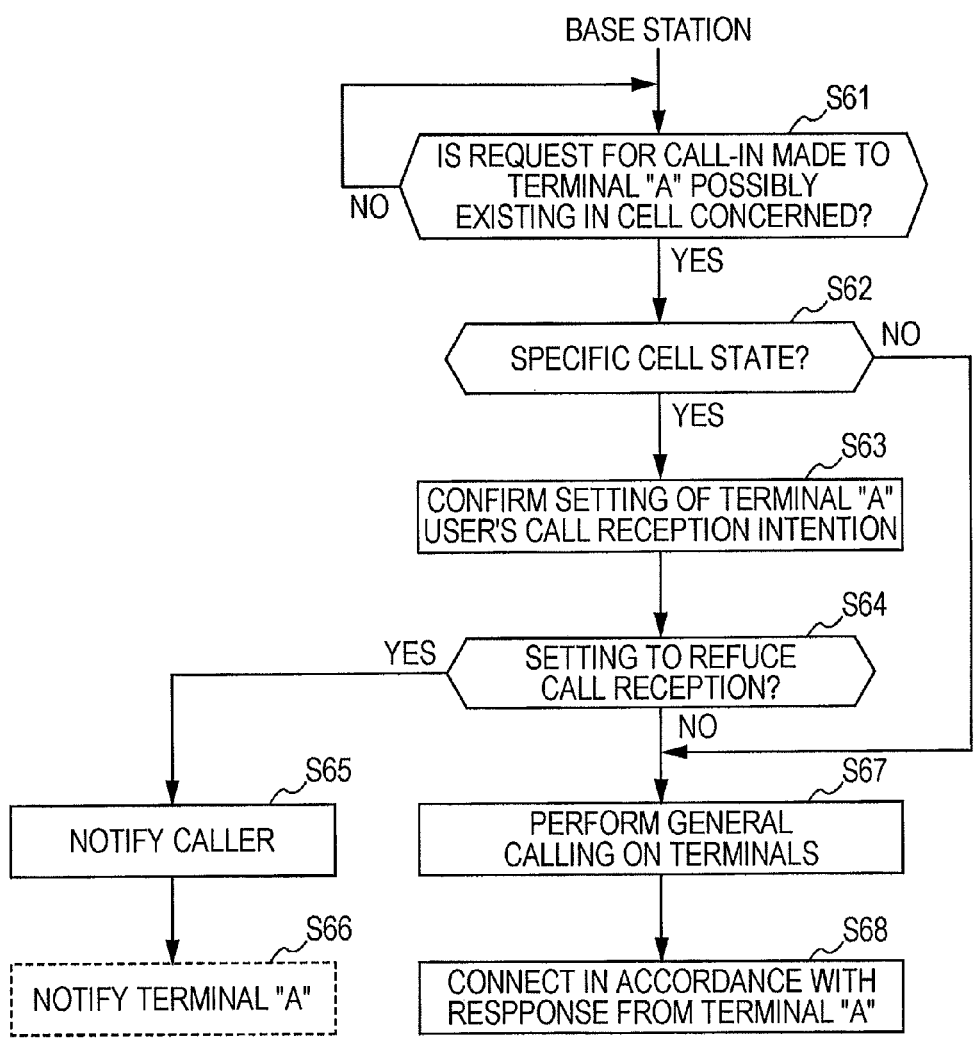
FIG. 10 is a flowchart illustrating an example of an operation that a base station performs in relation to the operation on a reception side according to an embodiment of the present invention.

FIG. 10 is a flowchart illustrating an example of an operation that the base station performs in relation to the operation that the reception side performs.

The base station performs general calling (paging) using a control channel on all the terminals in its own cell when it has been found that a terminal (the terminal A) to which the call-in has been made is registered in the position registered area concerned in response to a request from its subscriber exchange. If a response to the general calling is made from the corresponding terminal, it may be found in which cell of which base station the terminal is present. In the case that when a request for the call-in has been made to the terminal A which may possibly exist in the cell concerned (S61), if the current cell state is not the specific cell state (the state II or III in the above mentioned example) (No at S62), the base station will proceed to step S67 for general calling of terminals as usual. When the cell state is the specific cell state (Yes at S62), the previously set information is confirmed using the display screen as illustrated in FIG. 9. Setting of the call reception intention of the user of the terminal A is confirmed (S63). In the case that setting to refuse the call reception is being performed (Yes at S64), the base station notifies the terminal of its caller of the present condition (including the telephone number of the mate), for example, that it is now in a situation that the call reception may not be accepted (S65). This notification may be made via data communication in the form of a short message utilizing the telephone number. Electronic mail may be used when the mail address of the caller is confirmed. When the terminal of the user who has refused the call reception has moved to a cell which is in a usual state or the state of the cell concerned has turned to the usual state, the base station or a predetermined server (not illustrated) informs the terminal of the user who has refused the call reception of the status of the call-in (the telephone number and the called-up time of the caller)(S66). The notification may be sent to a stationary telephone in a voice after the jammed state has been relieved. The notification via data communication may be made later, not in real time.

In the case that setting to refuse the call reception is not performed (No at S64), general calling is performed on the terminals as usual (S67) and line connection is established in accordance with a response from the terminal A (S68).

Figure 11:
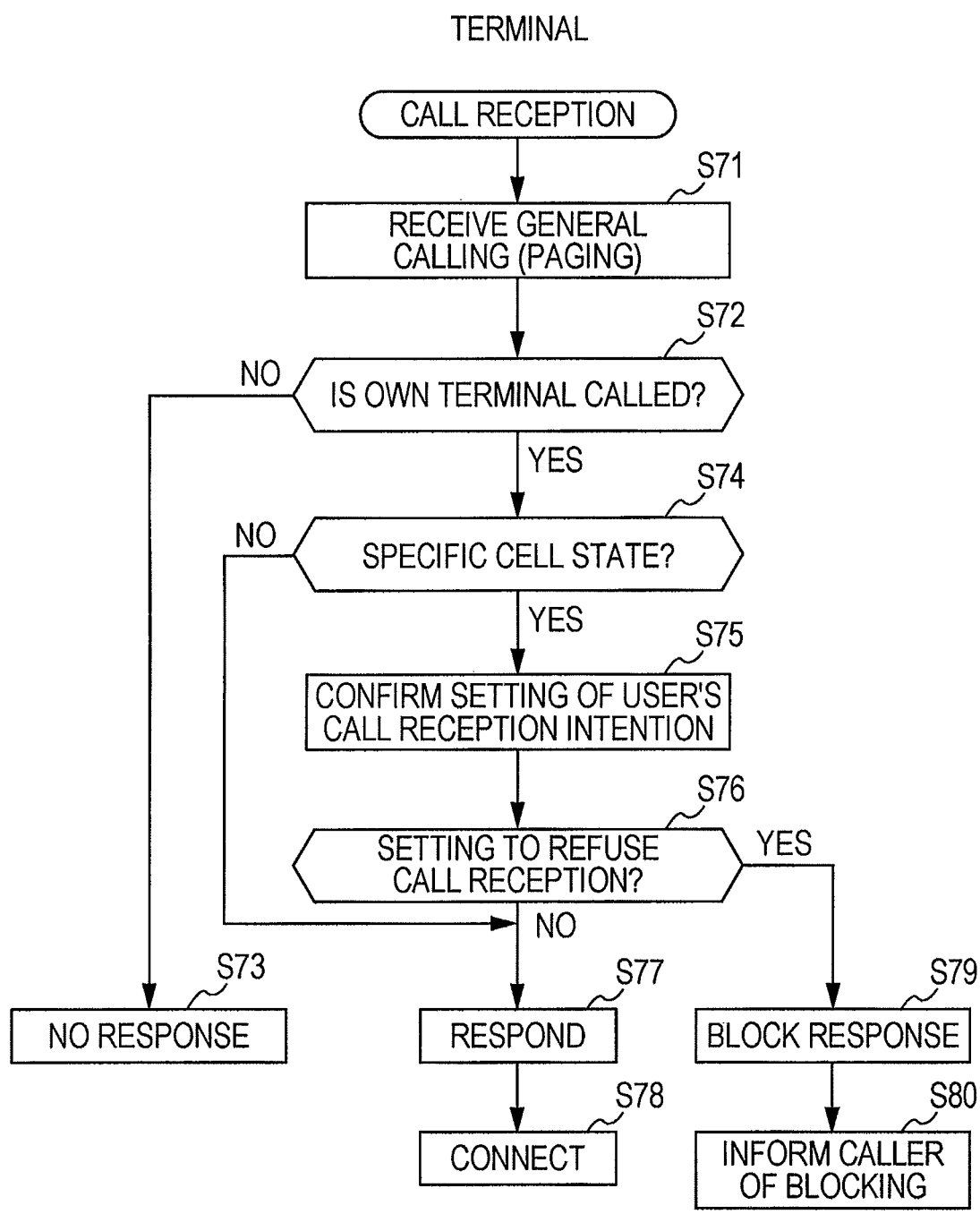
FIG. 11 is a flowchart illustrating an example of an operation that a terminal side performs in the case that refusal of call reception is performed on the terminal side according to an embodiment of the present invention.

FIG. 11 is a flowchart illustrating an example of an operation that a terminal performs in the case that a call reception refusing operation is performed using the terminal.

The terminal receives the above mentioned general calling (paging) from the base station (S71). In the above mentioned case, when a called terminal is not one's own terminal (No at S72), a response is not sent (S73) and this processing is terminated. At this stage, a call reception sound is not generated from the terminal.

In the case that one's own terminal is called up is confirmed, whether the state of the cell in which the terminal is currently present is the specific cell state (the state II or III in the above mentioned example) is confirmed (S74). When the cell is not in the specific cell state, the process proceeds to step S77.

When the cell is in the specific cell state, the details of setting as to the user's call reception intention which has been already set is confirmed from the screen as illustrated in FIG. 9 (S75). In the case that setting to refuse the call reception is not made (No at S76), a response is sent to the base station to inform it of the presence of the terminal (S77) and connection of the terminal to the line is accepted (S78). When setting to refuse the call reception is made, a response to the base station is blocked (S79). Then, the terminal informs the terminal of the caller of this fact as in the case at step S65 (S80).

Incidentally, instead of merely blocking the response, information that the response has been blocked may be returned to the base station side at step S79. The base station side recognizes that the terminal user has refused the call reception on the basis of this information and hence it may become possible for the base station side to grant the privilege as mentioned above to the user of the terminal concerned per call reception.

Figure 12:
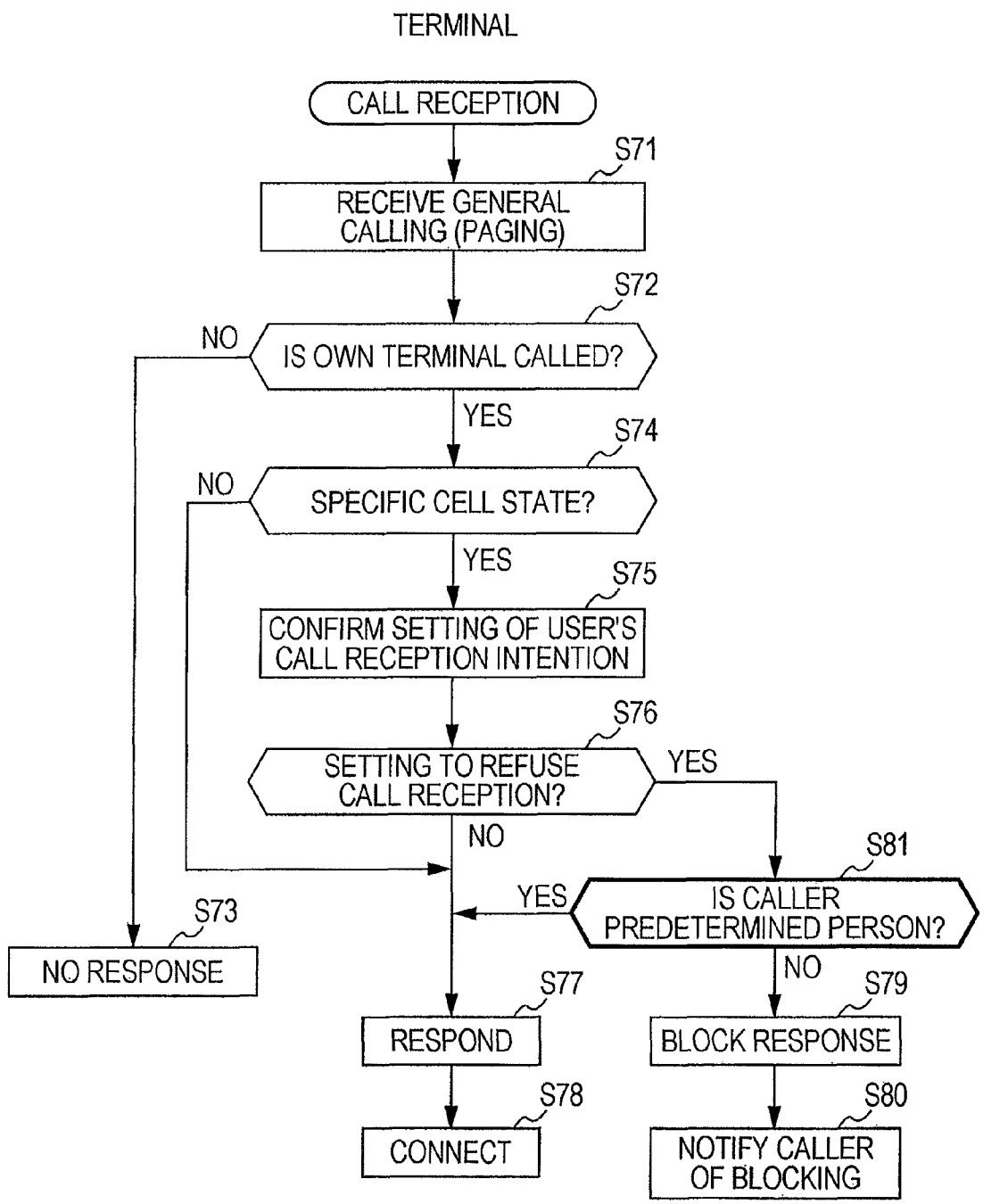
FIG. 12 is a flowchart of a modification of the processing illustrated in FIG. 11 according to an embodiment of the present invention.

FIG. 12 is a flowchart illustrating a modified example of the processing illustrated in FIG. 11. The same reference numerals are assigned to the same process steps as those in FIG. 11 and duplicated description thereof will be omitted. In the processing illustrated in FIG. 12, step S81 is added after the Yes branch from step S76 in FIG. 11. At step S81, even for setting to refuse the call reception, a response is made under a predetermined condition instead of immediately blocking the response. In the example illustrated in FIG. 12, the predetermined condition corresponds to the case in which the caller is a predetermined person, for example, a mate who has been specified in advance such that call reception from this person is accepted even in the case as mentioned above in the telephone directory built into the terminal or the caller is one of a predetermined number of persons who are higher in talking frequency.

The above description has been made in relation to the call transmission and the call reception concerning to talking over the mobile phone terminals. On the other hand, data communication such as mail is packet communication and hence its tolerance is thought to be larger than that of voice calling. However, when uploading and downloading of data of large size occur in the same area and the same time zone, the same problem as the above may occur. In particular, in a specific area in which QoS of data communication is guaranteed, the traffic may be expected to become tight. A user may perform in advance setting to refuse data communication (in particular, high speed data communication) in the specific area as mentioned above or a list of available data rates and charges is displayed such that a user may select one of them. In the latter case, the higher the data rate is, the higher the charge is set. A certain privilege may be granted from the side of a communication dealer to the user of the terminal concerned which has been set to refuse data communication at a high data rate.

Figure 13:
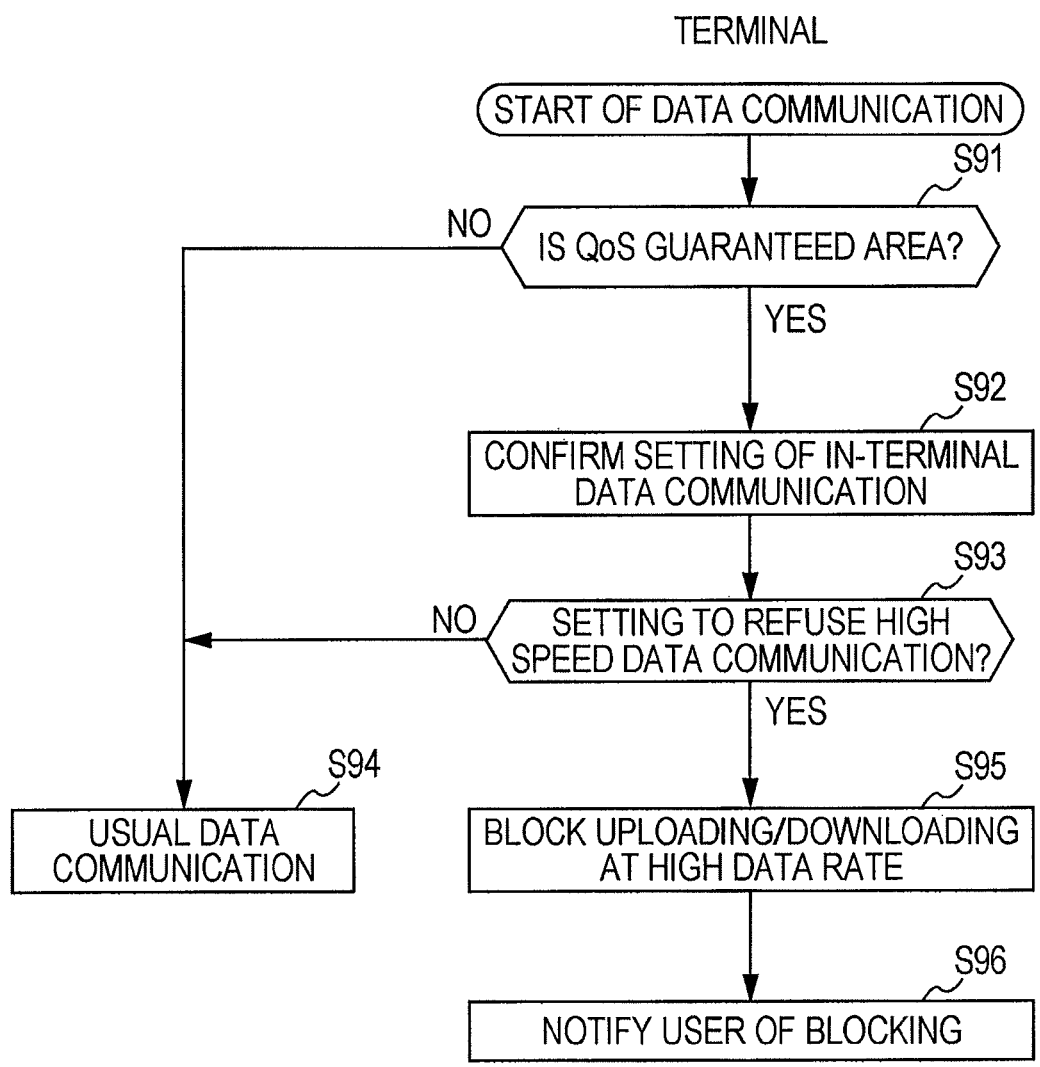
FIG. 13 is a flowchart illustrating an example of processing that the terminal side performs according to an embodiment in relation to data communication such as data uploading and downloading according to an embodiment of the present invention.

FIG. 13 is a flowchart illustrating an example of processing to be performed using a terminal according to an embodiment of the present invention in relation to data communication such as uploading and downloading of data.

In the case that an operation of instructing data communication concerned has been performed, when a location thereof is not in a QoS guaranteed area (No at S91), usual data communication is performed (S94). While when the location is in the QoS guaranteed area (Yes at S91), setting of data communication in the terminal is confirmed (S92). In the case that setting that high speed data communication is refused is not made (No at S93), usual data communication whose QoS is guaranteed is performed (S94). In the case that setting that high speed data communication is refused is made (Yes at S93), uploading/downloading at a high data rate is blocked (S95). As a result, uploading/downloading at a low data rate is executed. A notification that uploading/downloading at the high data rate has been blocked is sent to the user of the terminal concerned in the form of a message displayed on the terminal (S96).

Incidentally, the processing illustrated in FIG. 13 may be modified such that the process proceeds to step S92 when two conditions that the location is in the QoS guaranteed area and that the cell is in the specific cell state as described above are satisfied.

Although the preferred embodiments of the present invention have been described above, various modifications and alterations may be possible other than those which have been described above.

For example, setting may be made such that when a previously specified time period has been exceeded, a charge for the excess time is demanded of a terminal user who has not refused the call reception when jammed.

The present application contains subject matter related to that disclosed in Japanese Priority Patent Application JP 2008-276511 filed in the Japan Patent Office on Oct. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A radio communication control apparatus comprising;
   a control unit configured to control wireless communication from a user terminal, the control unit including a state detecting section configured to detect a predetermined communication condition and at least one control section operable to:
   send a message by a communication unit to the user terminal to notify the user that the predetermined communication condition has been detected and inviting the user to confirm the user's intention to continue wireless communication with an extra charge following the detection of the predetermined condition,
   detect confirmation from the user terminal of the user's intention to continue the wireless communication with the extra charge from the user terminal,
   wherein the control unit configures the message sent to the user terminal to include at least one procedure selectable by the user for continuing wireless communication with the extra charge determined by the selected procedure, such that the selected procedure indicates the user's confirmation of the user's intention to continue the wireless communication.

2. The radio communication control apparatus of claim 1, wherein the wireless communication comprises data communication, and the predetermined condition relates to data size.

3. The radio communication control apparatus of claim 2, wherein the predetermined condition is data of a size that exceeds a particular size.

4. The radio communication control apparatus of claim 1, wherein the message sent to the user terminal identifies the extra charge should the user continue the wireless communication.

5. The radio communication control apparatus of claim 4, wherein the message identifies available data communication rates and charges associated with those data communication rates.

6. The radio communication control apparatus of claim 5 wherein the procedure to continue the wireless communication includes the user's selection of a data communication rate.

7. The radio communication control apparatus of claim 4, wherein the procedure to continue the wireless communication includes the user's pre-selection of confirmation of intention to continue the wireless communication with extra charge.

* * * * *